United States Patent Office 3,644,295
Patented Feb. 22, 1972

3,644,295
SATURATED LINEAR POLYESTERS CONTAINING A SALT OF CAMPHORSULFONIC ACID
Mary J. Stewart, Riddlewood, and John A. Price, Swarthmore, Pa., assignors to FMC Corporation, Philadelphia, Pa.
No Drawing. Filed May 14, 1969, Ser. No. 824,700
Int. Cl. C08g 39/04
U.S. Cl. 260—75 S
11 Claims

ABSTRACT OF THE DISCLOSURE

A polyester composition comprising a saturated linear polyester resin containing a minor amount of an ammonium or metal salt of camphorsulfonic acid.

---

This invention relates to highly polymeric linear polyesters which have improved dyeability. More particularly, the present invention relates to novel homopolymeric or copolymeric polyester resin which can be formed into filaments, films, or other shaped articles and which can be dyed with basic-type dyes. The term "basic dye" is used herein to denote cationic organic dyes.

The homopolymer and copolymer polyester resins of the present invention are known as saturated linear polyesters and can be prepared by first carrying out a condensation reaction between one or more aromatic dicarboxylic acids or diesters thereof which do not contain any ethylenic unsaturation and one or more suitable saturated diols to form a prepolymer. The resulting prepolymer is then polycondensed to form the saturated linear polyester resin. When an ester of a dicarboxylic acid is used as a starting material, it is first reacted with a diol in the presence of a transesterification catalyst by means of a transesterification reaction; whereas when a dicarboxylic acid is used as a starting material, it is first subjected to a direct esterification with the diol in the presence of what is generally known as a first stage additive or ether inhibitor. In either instance, the resulting product, which may be generally described as a polyester prepolymer whether it is homopolymeric or copolymeric, is then polycondensed in the presence of a polycondensation catalyst to form the desired polyester resin.

For example, in the transesterification method of preparing polyethylene terephthalate, ethylene glycol is reacted with dimethyl terephthalate to form a polyester prepolymer which is comprised mainly of bis-2-hydroxyethyl terephthalate; or in the direct esterification method, ethylene glycol is reacted with terephthalic acid to form the resulting polyester prepolymer which is then polycondensed to form the desired polyester resin.

Linear polyester resins such as polyethylene terephthalate and others are widely used in the production of filaments, films, and the like. However, it is generally known that such polyester resins cannot be satisfactorily dyed with the basic-type dyes.

Homopolymer or copolymer polyester resins which are suitable for filament and film-forming purposes should have a carboxyl content value of below about 50 equivalents per million grams (eq./$10^6$ gr. or meq./kg.), a birefringent melting point of preferably not less than about 260° C., a diethylene glycol content preferably less than about 1 percent by weight, and a suitably high intrinsic viscosity. Additionally, especially for filament-forming purposes, it is necessary in many instances that the polyester resin be dyeable with cationic or basic-type dyes.

Therefore, it is an object of the present invention to provide novel saturated linear polyester resin compositions which are dyeable with basic dyes.

It is another object of this invention to provide highly polymeric saturated linear polyester resin compositions which have physical and chemical properties which make them particularly well-suited for filament and film-forming purposes.

It is a further object of the present invention to provide highly polymeric linear polyethylene terephthalate resin compositions which can be dyed with cationic dyes.

These and other objects are accomplished in accordance with the present invention with polyester compositions comprising a saturated linear polyester resin containing a minor amount of an ammonium or metal salt of camphorsulfonic acid.

The saturated linear polyester resins used in the preparation of the subject cationic dyeable polyester compositions can be prepared by either the conventional ester-interchange reaction or direct esterification method, both of which are thoroughly disclosed throughout the prior art. Further, a minor amount of an ammonium or metal salt of camphorsulfonic acid can be incorporated into any homopolymeric or copolymeric saturated linear polyester resin in order to render the same dyeable with cationic dyes.

Any metal salt of camphorsulonic acid can be used as the modifier of the present polyester compositions. For example, the sodium, calcium, lithium, lead, potassium, barium, or zinc salt of camphor sulfonic acid can be used. One particular salt of camphorsulfonic acid which is readily available and comes within the above defined group is the sodium salt of dl-10-camphorsulfonic acid. The salts of camphorsulfonic acid as used in the subject compositions can be any of the optically active forms available. The dl or racemic form is most readily available, and is therefore most often used.

In the practice of the present invention, the above defined salts of camphorsulfonic acid can be incorporated in the resinous composition at various stages. For example, in the preparation of the subject homopolymeric or copolymeric polyester resins, the present camphorsulfonic acid salts can be suitably mixed in the polyester reactants before commencing the reaction or at any stage after the initial reaction has begun. The camphorsulfonic acid salts used in the present compositions can also be mixed or blended into the polyester resin after the polycondensation stage has been completed while the resin is still molten in order to obtain a uniform blend of polyester resin and salt of camphorsulfonic acid.

It has been determined that the present salts of camphorsulfonic acid, as defined above, are effective in rendering polyester resin compositions dyeable with cationic type dyes when employed in amounts ranging from about 0.5 to 10 mole percent based on the moles of dicarboxylic acid or diester used to prepare said polyester resin. Usually, however, in most instances, it has been found that concentrations ranging from about 1 mole percent to 5 mole percent are preferred in most instances due to the fact that most polyesters containing such amounts are found to dye satisfactorily with cationic dyes and exhibit satisfactory physical and chemical properties for the preparation of filaments and films. However, when indicated, concentrations less or greater than the above can be used.

Several preferred embodiments of the polyester compositions of the present invention are further illustrated by the following examples.

EXAMPLE I 300 grams of dimethyl terephthalate, 198 mls. of ethylene glycol, 19.8 grams of the sodium salt of dl-10-camphorsulfonic acid [5 mole percent based on dimethyl terephthalate (DMT) content], and 0.12 gram of lithium hydride was charged into a reaction vessel equipped with a nitrogen inlet, distilling arm, heating means and stirring means. The reaction mixture was agitated and heated at atmospheric pressure to about 198° C. in a nitrogen atmosphere with stirring. The reaction mixture was held at about 198° C. for about 2 hours during which time by-product methyl alcohol was distilled off. After the transesterification reaction was about 80 percent complete, the temperature was allowed to rise to about 230° C. over a period of about 1 hour to distill off any remaining by-product methyl alcohol and form the polyester prepolymer. The resulting prepolymer was allowed to cool under an atmosphere of nitrogen.

EXAMPLE II 50 grams of the prepolymer of Example I and 0.02 gram of antimony trioxide was placed in a reaction vessel. The reaction mixture was heated at about 280° C. under reduced pressure of about 0.1 mm. of mercury while under agitation for about two hours to bring about the polycondensation of the prepolymer and formation of a polyester resin product. The polyester resin product formed had an intrinsic viscosity of 0.52, a carboxyl content value of 17 meg./kg., a diethylene glycol content of 0.54 percent, and a birefringent melting point of about 263° C.

EXAMPLE III 600 grams of dimethyl terephthalate, 396 mls. of ethylene glycol, 23.8 grams of the sodium salt of dl-10-camphorsulfonic acid [3 mole percent based on DMT content], and 0.24 gram of lithium hydride was charged into a reaction vessel equipped with a nitrogen inlet, a distilling arm, heating means and stirring means. The reaction mixture was agitated and heated at atmospheric pressure to about 198° C. in a nitrogen atmosphere. The reaction mixture was held at about 198° C. for about two hours during which time by-product methyl alcohol was distilled off. After the reaction was approximately 80 percent completed, the temperature was allowed to rise to 230° C. over a period of about one hour to distill off any remaining by-product methyl alcohol and any excess glycol and thereby to form a polyester prepolymer. The prepolymer was then allowed to cool under an atmosphere of nitrogen.

EXAMPLE IV 50 grams of the prepolymer product of Example III and 0.02 gram of antimony trioxide was placed in a reaction vessel. The reaction mixture was then heated at about 280° C. under reduced pressure of about 0.1 mm. of mercury while under agitation for about two hours to bring about the polycondensation of the prepolymer product. The polyester resin product had an intrinsic viscosity of 0.56, a carboxyl content value of 17 meq./kg., diethylene glycol content of 0.54 percent, and a birefringent melting point of about 264° C.

EXAMPLE V

A mixture comprising 600 grams of dimethyl terephthalate, 396 mls. of ethylene glycol, and 0.24 gram of lithium hydride was charged into a reaction vessel equipped with a nitrogen inlet, a distilling arm, heating means and stirring means. The reaction mixture was agitated and heated at atmospheric pressure to about 198° C. in a nitrogen atmosphere. The reaction mixture was held at about 198° C. for about two hours during which time by-product methyl alcohol was distilled off. Then the temperature of the reaction mixture was allowed to rise to about 230° C. over a period of about one hour to distill off any remaining by-product methyl alcohol and any excess ethylene glycol and thereby to form the polyester prepolymer which was bis-2-hydroxyethyl terephthalate. The prepolymer was then allowed to cool under an atmosphere of nitrogen.

EXAMPLE VI 50 grams of the prepolymer product of Example V, 1.55 grams of the sodium salt of dl-10-camphorsulfonic acid (3 mole percent based on DMT content), and 0.02 gram of antimony trioxide were charged into a reaction vessel. The reaction mixture was then heated at about 280° C. under reduced pressure of about 0.1 mm. of mercury while under agitation for about two hours to bring about the polycondensation of the prepolymer reactants and formation of a polyester resin composition. The resulting polyester resin composition had an intrinsic viscosity of 0.52, a carboxyl content value of 16 meq./kg., and a birefringent melting point of about 264° C.

EXAMPLE VII 50 grams of the prepolymer product of Example V, 2.59 grams of the sodium salt of dl-10-camphorsulfonic acid (5 mole percent based on DMT content), and 0.02 gram of antimony trioxide were charged into a reaction vessel. The reaction mixture was then heated at about 280° C. under reduced pressure of about 0.1 mm. of mercury while under agitation for about two hours to bring about the polycondensation of the prepolymer reactants and formation of a polyester resin composition. The resulting polyester resin composition had an intrinsic viscosity of 0.43, a carboxyl content value of 14 meq./kg., and a birefringent melting point of about 266° C.

For illustration purposes the dyeability of the various polyester resin products prepared in the above examples and other commercially available products were tested for dyeability with cationic dyes. The numerical values given below under the heading "Cationic Dye Value" were obtained by measuring the reflectance of the dyed resin with a "Color-Eye" (Model D-1) which is the trade name for a differential colorimeter manufactured by the Instrument Development Laboratories, Attleboro, Mass. The color values obtained are based on luminance (Y in the C.I.E. System) which is a measure of the proportion of the incidence light reflected relative to a white vitrolite standard and, therefore, a measure of the whiteness of the copolyester resin product being evaluated. Based on a theoretically possible Y value of 100, the higher the Y value, the whiter the resin product. Correspondingly, the lower the Y value or number, the more deep or intense the color of the dyed resin product. The determination of Y in the C.I.E. System as hereinafter set forth was carried out by using molded plaques of the polyester resin product having the dimensions 1" x 1" x 1/16" which were prepared on a Carver press.

The prepared molded plaques of the polyester resin samples to be evaluated for dyeability were then subjected to the following dyeing procedure.

Cationic dye test

A dye bath was prepared containing 1.25 g. Sevron Blue ER, 10 g. Carolid 3F carrier, 12.5 g. Na$_2$SO$_4$ and 225 mls. water. This bath was heated to 120° F. and the samples entered. The bath containing the samples was raised to a boil over a 30 minute period and held at a boil for another 60 minutes. Two scour baths were prepared containing 6.25 mls. of a 1% Igepon T–51 Solution, 3.1 mls. of 1% Na$_2$CO$_3$ solution and 240 mls. water respectively. The samples were scoured in these baths at 140° F. for fifteen minutes each and then air dried.

The polyester resin products of Examples II, IV, VI, and VII, along with a commercially available polyester resin marketed for cationic dyeing, were subjected to the dye tests set forth above and the results obtained are indicated in the following table. A control consisting of a non-modified polyethylene terephthalate resin was also tested.

TABLE

Polyester resin product: Cationic dye value
- (a) Polyethylene terephthalate control ------ 16.3
- (b) Commercially marketed cationic dyeable polyester resin ------------------------ 6.2
- (c) Example II polyester resin composition -- 3.8
- (d) Example IV polyester resin composition -- 6.5
- (e) Example VI polyester resin composition -- 7.5
- (f) Example VII polyester resin composition - 5.3

The results in the above examples and those disclosed in the table clearly indicate the cationic dyeability of the subject polyester resin compositions, and the fact that they are well-suited for filament and film-forming purposes.

It is conceivable that in some instances, the intrinsic viscosity of some polyester resin compositions coming within the present invention may be somewhat lower than desired. However, substantially higher intrinsic viscosities can be obtained by using solid phase polymerization procedures.

The intrinsic viscosity values given in the above examples were measured in a 60% phenol-40% tetrachloroethane solution (wt./wt.), at 30° C. The other analytical values were determined by conventional laboratory procedures.

The present invention has been described in detail with particular reference to several preferred embodiments but it should be understood that many variations and modifications can be achieved within the teaching and scope of this invention as herein described. Therefore, the subject invention is not to be limited except as defined in the appended claims.

We claim:
1. A polyester composition comprising a polyethylene terephthalate resin containing from about 0.5 to 10 mole percent of an ammonium or metal salt of camphorsulfonic acid based on the moles of terephthalic acid or diester thereof used to prepare said polyethylene terephthalate resin.

2. A composition of claim 1 wherein the metal is sodium.

3. The composition of claim 1 wherein the saturated linear polyester is polyethylene terephthalate.

4. A composition of claim 1 wherein the salt is the calcium salt of camphorsulfonic acid.

5. A composition of claim 1 wherein the salt is the lithium salt of camphorsulfonic acid.

6. A composition of claim 1 wherein the salt is the lead salt of camphorsulfonic acid.

7. A composition of claim 10 wherein the salt is the sodium salt of dl-10-camphorsulfonic acid.

8. A composition of claim 1 wherein the salt is the potassium salt of dl-10-camphorsulfonic acid.

9. A composition of claim 1 wherein the salt is the barium salt of dl-10-camphorsulfonic acid.

10. A composition of claim 1 wherein the camphorsulfonic acid is present in an amount ranging from about 1 to 5 mole percent based on the moles of terephthalic acid or diester thereof used to prepare said polyethylene terephthalate resin.

11. A composition of claim 1 wherein the salt is the sodium salt of dl-10-camphorsulfonic acid.

References Cited

UNITED STATES PATENTS

| | | | |
|---|---|---|---|
| 2,465,319 | 3/1949 | Whinfield et al. | 260—75 |
| 3,310,532 | 3/1967 | Kazama et al. | 260—75 |
| 3,432,472 | 3/1969 | Caldwell et al. | 260—75 |

WILLIAM H. SHORT, Primary Examiner

L. P. QUAST, Assistant Examiner

U.S. Cl. X.R.

8—4, 179; 260—30.8 R, 40 R

PO-1050
(5/69)

UNITED STATES PATENT OFFICE
CERTIFICATE OF CORRECTION

Patent No. 3,644,295 -    Dated    2/22/72

Inventor(s)   Mary J. Stewart and John A. Price

It is certified that error appears in the above-identified patent and that said Letters Patent are hereby corrected as shown below:

Delete Claim 3, which was cancelled by amendment.

Signed and sealed this 20th day of June 1972.

(SEAL)
Attest:

EDWARD M.FLETCHER,JR.
Attesting Officer

ROBERT GOTTSCHALK
Commissioner of Patents